United States Patent Office 3,525,725
Patented Aug. 25, 1970

3,525,725
PROCESS FOR THE PRODUCTION OF
ACRYLONITRILE POLYMERS
Dieter Kramer and Carlhans Suling, Leverkusen, Germany, assignors to Farbenfabriken Bayer Aktiengesellschaft, Leverkusen, Germany, a corporation of Germany
No Drawing. Filed July 6, 1967, Ser. No. 651,382
Claims priority, application Germany, July 11, 1966,
F 49,666
Int. Cl. C08f 3/76, 15/22, 15/36
U.S. Cl. 260—88.7         5 Claims

ABSTRACT OF THE DISCLOSURE

Acrylonitrile polymers containing at least 80% acrylonitrile and up to 20% other copolymerizable ethylenically unsaturated compounds are prepared by polymerizing in a polar organic solvent for acrylonitrile polymers in the presence of catalytic amounts of a quaternary ammonium salt of an aliphatic or aromatic sulfonamide. The final products are useful in production of films and filaments.

This invention relates to a process for the production of acrylonitrile polymers and copolymers by polymerisation in an organic solvent for polyacrylonitrile.

More specifically this invention relates to a process for the production of acrylonitrile polymers or copolymers, containing at least 80% acrylonitrile and up to 20% other polymerisable unsaturated vinyl compounds by polymerisation in solution with an ionic catalyst, said ionic catalyst being a quaternary ammonium salt of sulphonamides of aliphatic or aromatic amines. The process being effected in an organic solvent for polyacrylonitrile at temperatures from —60 to +5° C., the catalyst being used in amounts from 0.1 mmol to 0.1 mol per mol of monomer.

It is known that polyacrylonitrile can be polymerised or copolymerised in organic solvents in the presence of polymerisation initiators. So far as conventional initiators for solution polymerisation are concerned, it is necessary to distinguish between two groups.

(1) Radical initiators or initiator systems (Belgian patent specification 572,655). Initiator systems of this kind have the disadvantage that polymerization has to be carried out at relatively high temperatures, and that the desired degree of polymerisation can in fact only be achieved under industrially unfavourable conditions, for example a high monomer concentration coupled with long reaction times, in view of the high transfer constants of the solvents.

(2) Initiators or initiator systems which initiate polymerisation by an ionic mechanism (U.S. Pat. No. 3,006,894). Although such initiators are effective even at low temperatures, they have the disadvantage of poor solubility in dimethyl formamide. In addition, the initiators and solutions thereof are difficult to handle because of their high toxicity.

So far as the anionic solution polymerisation of acrylonitrile is concerned, it is known from J. Polymer Sc., vol. 49, pp. 231 to 240 (1961) that when polymerisation is initiated by quaternary ammonium hydroxides, it is only possible to obtain compounds of relatively low molecular weight in yields of less than 50%. In addition, the use of these initiators promotes the formation of brown-coloured solutions. One particular disadvantage is that when quaternary ammonium bases are used, it is not possible to control the degree of polymerisation by way of the initiator concentration.

It is an object of this invention to provide a process for the production of acrylonitrile polymer solutions in high yields with an improved degree of polymerisation by polymerising acrylonitrile alone or together with other copolymerisable ethylenically unsaturated compounds in a polar organic solvent for polyacrylonitrile in the presence of a quaternary ammonium salt of aromatic or aliphatic sulphonamides as polymerisation initiator.

The quaternary ammonium salts of sulphonamides of aliphatic or aromatic amines can be obtained by reacting a quaternary ammonium halide with alkali metal derivatives of aliphatic or aromatic sulphonamides in anhydrous solvents. For example, 0.25 mol of a quaternary ammonium halide and 0.25 mol of a sulphonamide sodium salt are separately dissolved in 200 parts by weight of dry ethanol, and the two solutions are combined. After standing for 12 hours at room temperature, the precipitated alkali metal halide is filtered off in the strict absence of moisture, and an atmosphere of nitrogen. The clear, alcoholic solution is then carefully concentrated in a water-jet vacuum at 30–40° C. A colourless crystal mass is obtained which, after drying over $P_2O_5$ in a high vacuum, is suitable for use as a polymerisation initiator.

Examples of catalytically-active sulphonamide salts are compounds derived from aromatic or aliphatic sulphonic acids, such as benzene sulphonic acid, methane sulphonic acid, ethane sulphonic acid or cyclohexane-sulphonic acid and from long-chain aliphatic sulphonic acids; for example the tetramethyl ammonium salt of N-methylmethane-sulphonamide, the tetramethyl ammonium salt of N-methylbenzene sulphonamide, the tetraethyl ammonium salt of N-methylcyclohexane sulphonamide and the dimethylphenylbenzyl ammonium salt of N-ethylcyclohexane sulphonamide.

The catalytically-active sulphonamide salts correspond to the general formula:

in which $R_1$, $R_2$, $R_3$, $R_4$, $R'$ and $R''$, which may be the same or different represent aromatic, aliphatic or araliphatic radicals.

The polymerisation initiators are used in quantities of at least 0.1 mmol and at most 0.1 mol per mol of monomer, and preferably in quantities of 0.05 mol to 0.4 mmol per mol of monomer. Polymerisation itself is carried out in the absence of water and $CO_2$ in polymerisation vessels which can be cooled. There is no need to keep out traces of oxygen during polymerisation. The catalyst is introduced into the polymerisation medium, preferably at around room temperature and the catalyst solution is cooled to around —60° C., after which the dried monomeric acrylonitrile alone or together with a comonomer is run into the polymerisation vessel over a short period. When, after a latent period, the beginning of polymerization is shown by a rise in temperature, precautions are taken, in the form of effective cooling, to ensure that the temperature in the reaction vessel does not exceed +5° C. Polymerisation is complete within a few hours and the polymers can be precipitated from the clear solutions. Alternatively, films or fibres may be directly obtained from the polymer solutions. Polar organic solvents for polyacrylonitrile, such as dimethyl formamide, dimethyl sulphoxide, dimethyl acetamide, methylene glycol carbonate, and similar solvents are used as the solvents. Useful comonomers are acrylic acid esters, methacrylic acid esters, vinylacetate, vinylchloride and vinylidene chloride.

Compared with conventional catalysts, the catalysts according to the invention are distinguished by the fact that they are not toxic and are easier to measure out because the sulphonamide salts are solid, easy to handle compounds which give off neither hydrogen cyanide nor hydrogen sulphide under the influence of $CO_2$ or of acids.

The following examples illustrate in particular the object of this invention without limiting the invention.

EXAMPLE 1

100 parts by weight of dry dimethyl formamide (DMF) are placed in a polymerisation vessel. The air is displaced by nitrogen, after which 0.382 part by weight of phenyl-benzyldimethylammonium - N - methyl - benzene sulphonamide are introduced into the solution. The ammonium salt dissolves soon. The solution of the quaternary ammonium salt in DMF is then cooled to −60° C. and 106 parts by weight of acrylonitrile are introduced into it over a short period. The temperature should not exceed −40° C.

Polymerisation commences after a latent period. A reaction temperature of from −15 to −10° C. is maintained, 1 g. of HCl in the form of a solution in DMF, being added to the reaction mixture after an interval of two hours.

A clear polymer solution free from swollen components is obtained and can be processed into films and filaments. The polymer yield is 70%.

EXAMPLE 2

The procedure is as in Example 1, except that 0.573 part by weight of phenylbenzyldimethylammonium - N-methyl-benzene-sulphonamide is used as the initiator. A polymer with a lower K-value than that of Example 1, is obtained in a yield of more than 85%, in a period of three hours. The polymer can be processed into mouldings.

EXAMPLE 3

A solution of 0.244 part by weight of tetramethylammonium - N - methyl-cyclohexane-sulphonamide in 1,000 parts by weight of dimethylformamide, is prepared in a polymerisation vessel. The initiator solution is cooled to −45° C., 106 parts by weight of acrylonitrile being added to it with effective external cooling. Polymerisation begins after a brief latent period, and is quickly complete. The rise in temperature is arrested by external cooling with a mixture of methanol and solid $CO_2$.

A solution of 0.5 part by weight of p-toluene sulphonic acid in a little dimethyl formamide is run into the mixture after an interval of three hours. A clear polymer solution is obtained from which the polymer can be precipitated by the addition of methanol. Polymerisation gives a polymer yield of 92%, the polymer has a K-value of 90.4.

What we claim is:

1. A process for the production of acrylonitrile polymers containing at least 80% acrylonitrile and up to 20% other copolymerisable ethylenically unsaturated compounds which comprises polymerising acrylonitrile alone or together with up to 20% of a copolymerizable compound in a polar organic solvent for polyacrylonitrile at a temperature of from −60° C. to +5° C. in the presence of catalytic amounts of a quaternary ammonium salt of an aliphatic, araliphatic or aromatic sulphonamide which corresponds to the general formula:

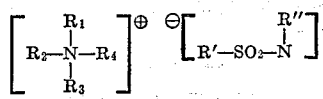

in which $R_1$, $R_2$, $R_3$, $R_4$, $R'$ and $R''$, which may be the same or different, represent aromatic, aliphatic or araliphatic radicals.

2. The process of claim 1, wherein the amount of said quaternary ammonium salt being from 0.1 mmol to 0.1 mol per mol of monomers.

3. The process of claim 1, wherein said polar organic solvent of dimethylformamide.

4. The process of claim 1, wherein said quartenary ammonium salt is phenyl - benzyl-dimethyl-ammonium-N-methylbenzene-sulphonamide.

5. The process of claim 1, wherein said quaternary ammonium salt is tetramethyl-ammonium-N-methyl-cyclohexane-sulphonamide.

References Cited

UNITED STATES PATENTS

| 2,750,357 | 6/1956 | Bredereck et al. | 260—88.7 |
|---|---|---|---|
| 3,012,983 | 12/1961 | Darby et al. | 260—30.8 |
| 3,060,157 | 10/1962 | Goodman et al. | |
| 3,301,841 | 1/1967 | Burleigh et al. | 260—88.7 |

HARRY WONG, JR., Primary Examiner

U.S. Cl. X.R.

260—29.1, 30.8, 32.6, 85.5